United States Patent Office 3,709,872
Patented Jan. 9, 1973

3,709,872
DISPERSIBLE PHENYL-AZO-PHENYL DYESTUFFS
Stefan Koller, Pratteln, Basel-Land, Switzerland, assignor to Ciba-Geigy AG, Basel, Switzerland
No Drawing. Filed Oct. 24, 1969, Ser. No. 869,380
Claims priority, application Switzerland, Nov. 7, 1968, 16,653/68
Int. Cl. C07c *107/06;* C09b *29/08, 29/26*
U.S. Cl. 260—207.1      12 Claims

ABSTRACT OF THE DISCLOSURE

Dyestuffs which are free from water-solubilizing groups dissociating acid in water and corresponding to the formula

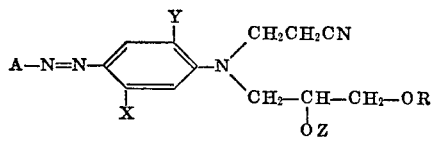

wherein A represents the residue of a diazo component of the benzene series having at least one non-ionogenic, electron-attracting substituent or the radical of a diazo component of the heterocyclic series, X and Y represent independently of each other, hydrogen, a lower alkyl group, lower alkanoylamino or halogen, Z represents an acyl radical and R represents an optionally substituted lower alkyl, cycloalkyl, aralkyl or aryl radical. These dyestuffs are distinguished by good affinity especially for polyester fibers, affording dyeings on these fibers which have good fastness properties and especially good fastness to light and sublimation.

---

The present invention relates to sparingly water-soluble azo dyestuffs, usable as dispersion dyestuffs, processes for their production, processes for the dyeing or printing of hydrophobic organic textile fibers, particularly of textile fibers made from linear polyesters of aromatic polycarboxylic acids with polyvalent alcohols or from cellulose esters and, as industrial products, the fiber material dyed with said dyestuffs.

It has been found that azo dyestuffs being free from water-solubilising groups dissociating acid in water and corresponding to the Formula I

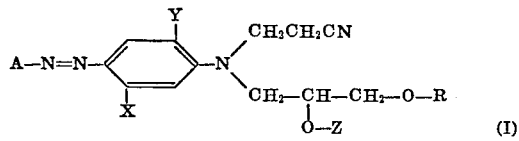    (I)

are characterised by particularly advantageous properties, e.g. good fastness to light and sublimation of the polyester dyeings produced therewith.

In the above Formula I

A represents a carbocyclic aryl radical having at least one non-ionogenic, electron-attracting substituent, or a hetercyclic radical of aromatic character, X and Y each represent, independently of each other, hydrogen, a lower alkyl group, lower alkanoylamino group or halogen, Z represents an acyl radical and R represents an optionally substituted lower alkyl, cycloalkyl, aralkyl or aryl radical.

The azo dyestuffs of Formula I, according to the invention, are obtained by coupling the diazonium compound of an amine of the Formula II,

A—NH$_2$     (II)

wherein A has the meaning given under Formula I, with a coupling component of the Formula III,

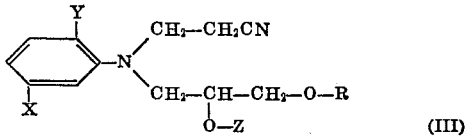    (III)

wherein X, Y, Z and R have the meaning given under Formula I.

The tarting materials of the Formulae II and III are so chosen that the azo dyestuff obtained is free from water-solubilising groups which dissociate acid in water, i.e. it contains no sulphonic acid groups, carboxylic acid groups or phosphoric acid groups.

Where A represents a carbocyclic aryl radical, this can be mononuclear or binuclear. Suitable in addition to naphthyl groups are, preferably, phenyl groups substituted as defined. Electron-attracting, non-ionogenic substituents of the radical A, especially of the phenyl radical, are e.g. halogen such as fluorine, chlorine or bromine; the cyano, nitro or trifluoromethyl group; also lower alkylsulphonyl or arylsulphonyl groups, sulphonic acid arylester groups such as the sulphonic acid-phenyl-, alkylphenyl- or -halogenphenyl-ester groups; carboylic acid ester groups, e.g. the carbophenoxy group, but especially lower carbalkoxy groups such as the carbomethoxy, carbethoxy, carboisopropoxy or carbobutoxy group; the sulphonic acid amide group or carboxylic acid amide group; N-mono- or N,N-disubstituted carbamoyl or sulphamoyl groups with a phenyl group and/or with lower alkyl, lower hydroxyalkyl, lower alkanoyloxyalkyl, lower alkoxyalkyl, lower cyanoalkyl or with cycloalkyl or phenalkyl substituents. All these groups can likewise be non-ionogenically further substituted. In additional to electron-attracting substituents, the carbocyclic radical A can however also contain non-ionogenic electron-releasing substituents, e.g. lower alkoxy groups such as methoxy or ethoxy groups, the phenoxy group and the alkyl- or halogen-substituted phenoxy groups, or acylamino groups, e.g. lower alkanoylamino groups such as the acetylamino groups, aroylamino groups such as the benzoylamino group, or also lower alkylsulphonylamino groups such as the methylsulphonylamino group or arylsulphonylamino groups such as the phenylsulphonylamino group.

If A represents a heterocyclic radical of aromatic character, then it denotes in particular radicals of 5-membered, especially N-containing heterocycles which belong, e.g. to the thiazole, isothiazole or thiodiazole series. Also suitable are radicals of polynuclear condensed heterocycles which then preferably have a condensed benzene ring such as, e.g. the benzothiazole ring. These mononuclear or polynuclear aromatic heterocyclic radicals can likewise contain non-ionogenic substituents of the above stated kind, common in azo dyestuffs, especially halogens, pseudohalogens such as cyano or thiocyano groups, nitro, lower alkyl, lower alkoxy, phenyl groups, lower alkylsulphonyl and sulphonic acid amide groups, optionally mono- or di-substituted by lower alkyl groups.

Preferred azo dyestuffs according to the invention are azo compounds of Formula I wherein A represents (1) a phenyl radical bearing the following substituents:
 (a) as first substituent nitro or cyano,
 (b) a second substituent selected from hydrogen, nitro, cyano, chlorine, bromine, trifluoromethyl, lower alkylsulfonyl, phenylsulfonyl, lower alkoxy, lower alkoxy-sulfonyl, lower alkoxy-carbonyl and di-(lower alkyl)amino-sulfonyl and (c) a third substituent selected from hydrogen, chlorine and bromine;
(2) nitro-thiazolyl;
(3) a benzothiazolyl radical any substituent of which, is in the benzene nucleus and is selected from thiocyano, lower alkoxy and lower alkylsulfonyl.

Advantageously the above said first substituent of the phenyl radical is in o- or more preferably in p-position relative to the azobridge at the said phenyl radical. Among these azo dyestuffs of the Formula I, those wherein A represents a phenyl radical having in the p-position to the azo group a nitro group and in one o-position to the azo group a cyano or lower alkylsulphonyl group are particularly preferred.

Diazo components of the Formula II suitable for carrying out the process according to the invention are, e.g.

1-amino-4-nitrobenzene,
1-amino-4-cyanobenzene,
1-amino-2,4-dinitrobenzene,
1-amino-2,4-dicyanobenzene,
1-amino-3-chloro-4-cyanobenzene,
1-amino-2-chloro-4-cyanobenzene,
1-amino-2-cyano-4-nitrobenzene,
1-amino-2,6-dichloro-4-nitrobenzene,
1-amino-2-chloro-4-nitro-6-bromobenzene,
1-amino-2-chloro-4-nitro-6-methoxybenzene,
1-amino-2,4-dinitro-6-chlorobenzene,
1-amino-2-chloro-4-nitrobenzene,
1-amino-2-methylsulphonyl-4-nitrobenzene,
5-nitro-2-aminothiazole,
5-acetyl-3-nitro-2-aminothiophene,
2-amino-6-methoxybenzothiazole,
2-amino-6-thiocyano-benzothiazole,
2-amino-6-cyano-benzothiazole or
2-amino-6-methylsulphonyl-benzothiazole.

If X and Y in Formulae II and III are a lower alkyl group then they advantageously have 1 to 4 carbon atoms; if they are lower alkanoylamino groups then their alkanoyl radical is, e.g. the formyl, acetyl, propionyl or butyryl radical. If they are halogens, then they are in particular bromine, or especially chlorine. Preferably, X denotes hydrogen, chlorine or the methyl group and Y denotes hydrogen.

If R represents a lower alkyl radical, then this has especially 1 to 4 carbon atoms. If this alkyl radical is substituted, then suitable substituents are, e.g. lower alkoxy groups such as the methoxy group, the cyano group or halogens such as chlorine or bromine, also carbocyclic-aromatic radicals, e.g. the phenyl radical, a halogenphenyl radical or alkylphenyl radical, or heterocyclic groups, e.g. the 2-thienyl, 2-furyl or 2-tetrahydrofuryl radical. As substituted alkyl radicals, special mention is made of the α- or β-phenylethyl group and, in particular, the benzyl group as well as the tetrahydrofurfuryl group.

Suitable as a cycloalkyl group represented by R are, e.g. cycloalkyl groups having preferably 5- or 6-membered rings and especially the cyclohexyl group.

If R represents an aryl radical, then this preferably belongs to the benzene series; it can contain the usual non-ionogenic ring substituents. Such substituents, especially on the phenyl radical, are, e.g. halogens such as fluorine, chlorine or bromine, lower alkyl or lower alkoxy groups. In the azo dyestuffs of Formula I, according to the invention, the substituent R represents especially a phenyl group.

Z represents particularly a lower unsubstituted or non-ionogenically substituted alkanoyl group, the alkanoyl unit of which advantageously has 2 to 4 carbon atoms. The alkanoyl group can contain, as non-ionogenic substituents, e.g. halogens such as chlorine or bromine, or lower alkoxy groups such as the methoxy or ethoxy group. Furthermore, the acyl radical Z can be an aroyl radical such as the benzoyl radical, or a lower alkoxycarbonyl radical such as the methoxycarbonyl or ethoxycarbonyl radical, a phenoxycarbonyl radical, a lower alkylaminocarbonyl radical such as the methylaminocarbonyl or ethylaminocarbonyl radical, an arylaminocarbonyl radical such as the phenylaminocarbonyl radical, or a lower alkylsulphonyl radical such as the methylsulphonyl or ethylsulphonyl radical, or an arylsulphonyl radical such as the phenylsulphonyl radical or p-methylphenylsulphonyl radical. Z preferably represents a lower alkanoyl group and especially an acetyl group.

The coupling components of the Formula III can be produced by methods known per se, e.g. by addition of epoxy compounds of the Formula IV,

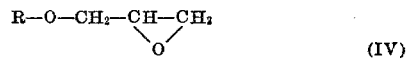

to amines of the Formula V

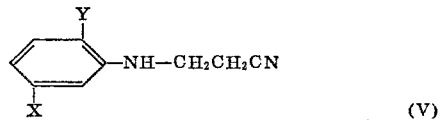

preferably at elevated temperature in the presence of glacial acetic acid or boron trifluoride etherate as catalyst, and acylation of the addition products of the Formula VI,

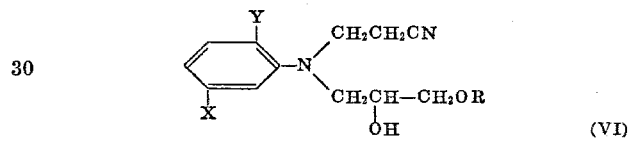

with an acylating agent introducing the radical Z. Such acylating agents are, e.g. the anhydrides of lower carboxylic acids such as acetic acid anhydride or propionic acid anhydride, the acyl chlorides and bromides of the aliphatic and aromatic series, e.g. acetyl, propionyl or benzoyl chloride or bromide, benzenesulphonic acid chloride or p-toluenesulphonic acid chloride or bromide, or lower alkylsulphonic acid chlorides or bromides such as mesyl chloride or bromide, also chloroformic or bromoformic acid esters, especially chloroformic or bromoformic acid methyl or ethyl esters, as well as lower alkylisocyanates such as methylisocyanate, or arylisocyanates such as phenylisocyanate.

Examples of particularly favourable coupling components of the Formula III are:

[N-β-cyanoethyl-N-(β-acetoxy-γ-methoxy-propyl)-amino]-benzene,
1-[N-β-cyanoethyl-N-(β-acetoxy-γ-methoxy-propyl)-amino]-3-methylbenzene,
[N-β-cyanoethyl-N-(β-acetoxy-γ-phenoxy-propyl)-amino]-benzene,
[N-β-cyanoethyl-N-(β-acetoxy-γ-4'-methylphenoxy-propyl)-amino]-benzene,
[N-β-cyanoethyl-N-(β-acetoxy-γ-4'-chlorophenoxy-propyl)-amino]-benzene,
1-[N-β-cyanoethyl-N-(β-methoxycarbonyloxy-γ-phenoxy-propyl)-amino]-3-methylbenzene,
1-[N-β-cyanoethyl-N-(β-ethoxycarbonyloxy-γ-phenoxy-propyl)-amino]-3-methylbenzene,
[N-β-cyanoethyl-N-(β-acetoxy-γ-(4'-methoxy-phenoxy)-propyl)-amino]-benzene,
[N-(β-cyanoethyl)-N-(β-acetoxy-γ-cyclohexyloxy-propyl)-amino]-benzene,
1-[N-(β-cyanoethyl)-N-(β-acetoxy-γ-cyclohexyloxy-propyl)-amino]-3-methylbenzene,
1-[N-β-cyanoethyl-N-(β-acetoxy-γ-phenoxy-propyl)-amino]-3-methylbenzene,
[N-β-cyanoethyl-N-(β-propionyloxy-γ-phenoxy-propyl)-amino]-benzene,
1-[N-β-cyanoethyl-N-(β-acetoxy-γ-phenoxy-propyl)-amino]-3-chlorobenzene, 1-[N-β-cyanoethyl-N-(β-acetoxy-γ-(β'-ethoxy-ethoxy)-propyl)-amino]-3-acetylamino-benzene, 1-[N-β-cyanoethyl-N-(β-acetoxy-γ-benzyloxy-propyl)-amino]-3-chlorobenzene, 1-[N-β-cyanoethyl-N-(β-acetoxy-γ-furfuryloxypropyl)-amino]-3-methylbenzene, 1-[N-β-cyanoethyl-N-(β-phenylamino-carbonyloxy-γ-phenoxy-propyl)-amino]-3-methylbenzene and

[N-β-cyanoethyl-N-(β-benzoyloxy-γ-ethoxy-propyl)-amino]-benzene.

The coupling of the diazonium compound of an amine of the Formula II with a coupling component of the Formula III is performed by the usual methods, preferably in strongly acid aqueous or organic-aqueous medium. To isolate the coupling product in the case of mineral acid coupling, the acid is gradually buffered, e.g. with alkali metal salts of lower fatty acids, such as sodium acetate.

A modification of the process, according to the invention, for the production of new sparingly water-soluble azo dyestuffs of the Formula I consists in reacting an azo compound of the Formula VII,

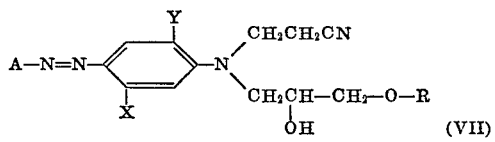

wherein A, X, Y and R have the above given meaning, with a compound introducing the radical Z, whereby the starting materials are so chosen that the end dyestuff of the Formula I contains no water-solubilising groups dissociating acid in water.

Azo compounds of the Formula VII are obtained, e.g. by coupling the diazonium compound of an amine of the Formula II with the corresponding coupling component, whereby the coupling is performed as hereinbefore described.

Suitable compounds introducing the radical Z are, e.g. the previously stated acylating agents.

The reaction of the azo compounds of the Formula VII with the compounds introducing the radical Z is advantageously performed at elevated temperature in a suitable organic solvent such as glacial acetic acid, chlorobenzene or dioxane, optionally in the presence of an acid-binding agent such as sodium acetate, magnesium oxide or pyridine.

The term "lower" as used in this specification and in the appended claims in connection with "alkyl" and "alkoxy" groups or moieties means that these groups or moieties have from 1 to 5 carbon atoms; in connection with "alkanoyl" and "carboxylic acids" it means that these groups and acids, respectively, have at most 5 carbon atoms.

The new azo dyestuffs of the Formula I are orange, red, brown to blue-red crystalline, sparingly water-soluble substances. They can be obtained analytically pure by recrystallisation from organic solvents, but such purification is not generally necessary with regard to their use for dyeing.

Azo dyestuffs according to the invention are suitable for the dyeing or printing of hydrophobic synthetic organic textile fibres, e.g. for the dyeing or printing of textile fibres made from polymeric esters, such as cellulose-2- to -2½- or -tri-acetate, but they are especially suitable for the dyeing or printing of textile fibres made from linear polyesters of aromatic polycarboxylic acids with polyvalent alcohols, particularly those made from polyethylene glycol terephthalate or polycyclohexane dimethylol terephthalate. These dyestuffs can also be used however for the dyeing of synthetic polyamide fibres, such as fibre material made from polyhexamethylene adipamide, polycaprolactam or polyundecanoic acid, as well as for the dyeing of polyolefin fibres, especially polypropylene fibres.

Depending on the composition, they are moreover suitable for the dyeing or pigmenting of lacquers, oils and waxes, as well as cellulose derivatives, particularly cellulose esters such as cellulose acetate, in the mass.

Preferably, the dyeing of the stated fibre materials with azo dyestuffs, according to the invention, is performed from an aqueous dispersion. It is therefore advantageous to finely divide the end products of the Formula I, usable as dispersion dyestuffs, by grinding with surface-active dispersing agents and possibly with further grinding auxiliaries.

Dispersing agents suitable for this purpose are, e.g. anionic tensides such as alkylaryl sulphonates, condensation products of formaldehyde with naphthalene-sulphonic acid and ligninsulphonates or non-ionogenic tensides, e.g. fatty alcohol or alkylphenylpolyglycol ether with a higher alkyl radical.

The dyeing of the polyester fibres with azo dyestuffs, according to the invention, from aqueous dispersion, is performed by the usual methods for polyester materials. Polyesters of aromatic polycarboxylic acids with polyvalent alcohols are preferably dyed at temperatures in excess of 100° C. under pressure. Dyeing can also be carried out, however, at the boiling point of the dye bath in the presence of dye-carriers, e.g. alkali metal phenylphenolates, polychlorobenzene compounds or similar auxiliary agents. Dyeing can also be performed by the pad-dyeing process with a subsequent heat treatment, e.g. thermofixing at 180–210° C. Cellulose-2- to -2½-acetate fibres are preferably dyed at temperatures of 80–85° C., whereas cellulose triacetate fibres, as well as synthetic polyamide fibre material are advantageously dyed at the boiling point of the dye bath. In the dyeing of the latter mentioned types of fibres, the use of dye carriers is not necessary.

The printing of the stated textile materials is also performed by the usual methods, e.g. by printing the material with the printing paste containing, in addition to the dyestuff and the dyeing accelerator, thickeners and the usual additives such as, e.g. urea, and subsequently fixing the dyestuff by steaming at 100–130° C. for 15 minutes.

End products of the Formula I, according to the invention, draw on to aforementioned hydrophobic organic fibres especially polyethylene glycol terephthalate fibres very well, and they produce on these fibres pure, strong, yellow, orange, scarlet, red, violet, brown and blue-red dyeings which, moreover, have a good fastness to washing, milling, rubbing, perspiration, solvents, decatizing, light and sublimation.

Moreover, azo dyestuffs according to the invention, possess the valuable property which is of great technical importance in the dyeing of mixed fabrics of appreciably reserving cotton and wool. By virtue of their good fastness to sublimation, these dyestuffs are very suitable for use in mixtures with other dispersion dyestuffs, which are fast to sublimation, for the dyeing of textile material using the pad-dyeing thermofixing process.

Azo dyestuffs according to the invention and especially the azo dyestuffs having the formula

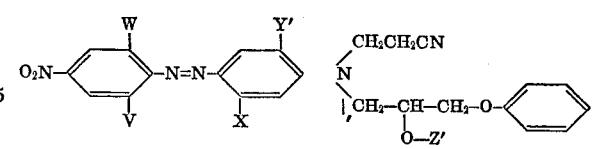

wherein

V represents hydrogen, cyano, chlorine or lower alkylsulfonyl,

W represents hydrogen or chlorine,

X' represents hydrogen, lower alkyl, lower alkanoylamino or chlorine,

Y' represents hydrogen or chlorine, and
Z' represents lower alkanoylamino and in particular acetyl
are distinguished from comparable known dyestuffs by their very good affinity and build-up properties on polyethylene glycol terephthalate fibres and particularly by the excellent fastness to light of the dyeings produced therewith. Furthermore, azo dyestuffs according to the invention, have a good stability in the liquor and to boiling The temperatures are given in degrees centigrade in the following examples.

EXAMPLE 1

16.3 g. of 1-amino-2-cyano-4-nitrobenzene are diazotised in the usual manner in 100 ml. of concentrated sulphuric acid with an amount of nitrosyl sulphuric acid corresponding to 6.9 g. of sodium nitrite. The diazonium solution obtained is added dropwise at 0–5° to a solution of 33.8 g. of N-(β-acetoxy-γ-phenoxypropyl)-N-(β-cyanoethyl)-aniline in 1000 ml. of 80% acetic acid, whereupon the dyestuff of the formula

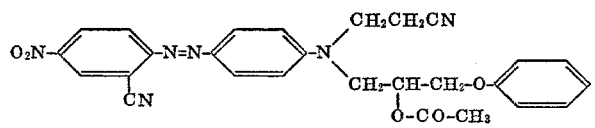

precipitates as a blackish-red powder. This is filtered off, washed with water and dried in vacuo at 60–70°.

After being milled with the sodium salt of a condensation product of the naphthalene-2-sulphonic acid with formaldehyde, this dyestuff dyes polyethylene glycol terephthalate fibres, from an aqueous dispersion in the presence of sodium-o-phenylphenolate as swelling agent, in red shades having very good fastness to light, washing, rubbing and sublimation.

The N - (β - acetoxy - γ-phenoxy-propyl)-N-(β-cyanoethyl)-aniline, used in this example, is obtained by the addition at 80° of 3-phenoxy-1,2-expoxypropane, with addition of 2% boron trifluoride ethereate, to N-β-cyanoethyl aniline and acetylation of the obtained N-(β-hydroxy-γ-phenoxy-propyl)-N-(β-cyanoethyl)-aniline with acetic acid anhydride.

EXAMPLE 2

13.8 g. of 1amino-4-nitrobenzene are diazotised in the usual manner. The diazonium solution obtained is added dropwise at 0–5° to a solution of 35.2 g. of N-(β-benzoyloxy-γ-methoxypropyl)-N-(β-cyanoethyl)-m-toluidine in 1100 ml. of 80% acetic acid. The reaction mixture is stirred for 16 hours at 0–5°, whereby the dyestuff of the formula

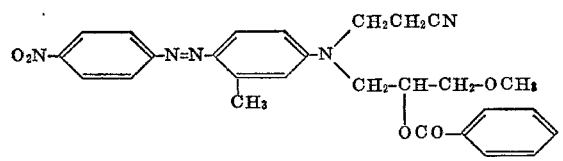

precipitates as a brown-red powder. This is filtered off, washed with water and dried in vacuo at 60–70°.

From a fine aqueous dispersion, this dyestuff dyes polyethylene glycol terephthalate fibres in pure orange shades. The dyeings have a good fastness to light and sublimation.

The N-(β-benzoyloxy-γ-methoxy-propyl)-N-(β-cyanoethyl)-m-toluidine used in this example as coupling component, is obtained by adding at 60° 3-methoxy-1,2-epoxypropane, with the addition of 2% boron trifluoride etherate, to N-β-cyanoethyl-m-toluidine, and converting the N-(β-hydroxy-γ-methoxy-propyl)-N-(β-cyanoethyl)-m-toluidine obtained by means of benzoyl chloride into the corresponding benzoic acid ester.

EXAMPLE 3

20.7 g. of 1-amino-2,6-dichloro-4-nitrobenzene are diazotised in the usual manner. The diazonium solution obtained is added dropwise at 5–10° to a solution of 37.4 g. of N - (β - methylsulphonyloxy-γ-phenoxy-propyl)-N-(β-cyanoethyl)-aniline in 950 ml. of glacial acetic acid and 50 ml. of water, whereupon by the addition of 200 g. of ice, the dyestuff of the formula

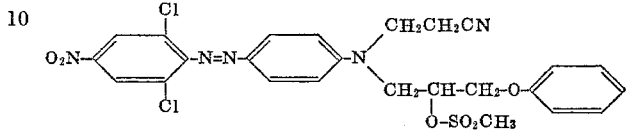

precipitates as a black crystal sludge. It is filtered off, washed with water and dried in vacuo at 40–50°.

Finely ground with lignin sulphonate, this dyestuff dyes polyethylene glycol terephthalate fibres or cellulose triacetate fibres, from an aqeuous dispersion, in brown shades. The dyeings have a very good fastness to light and sublimation.

The N - (β-methylsulphonyloxy-γ-phenoxy-propyl)-N-(β-cyanoethyl)-aniline, used in this example as coupling component, is obtained by adding 3-phenoxy-1,2-epoxypropane at 80°, with the addition of 2% boron trifluoride ethereate, to N-β-cyanoethylaniline and then reacting the N - (β-hydroxy-γ-phenoxy-propyl) - N - (β-cyanoethyl)-aniline obtained in anhydrous pyridine, with methylsulphonyl chloride.

EXAMPLE 4

14.5 g. of 2-amino-5-nitrothiazole are diazotised in 225 ml. of propionic acid and 75 ml. of glacial acetic acid with nitrosyl sulphuric acid, corresponding to 6.9 g. of sodium nitrite, at —5 to 0° in the usual manner. To this diazonium solution is added dropwise at 0° a solution of 35.3 g. of N-(β-N'-methylcarbamyloxy-γ-phenoxy-propyl)-N-(β-cyanoethyl)-aniline in 200 ml. of methanol, whereupon—after the addition of 500 g. of ice—the dyestuff of the formula

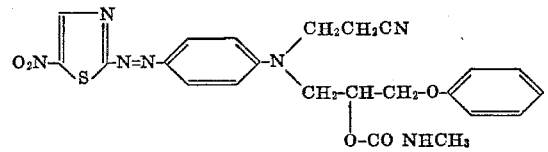

precipitates. The obtained violet crystals are filtered off, washed with water and dried in vacuo at 50–60°. After being ground with lignin sulphonate, this dyestuff dyes polyethylene glycol terephthalate fibres or cellulose triacetate fibres, from aqueous dispersion, in violet shades. The dyeings have a very good fastness to light and sublimation.

The N - (β-N'-methylcarbamyloxy-γ-phenoxy-propyl)-N-(β-cyanoethyl)-aniline, used as coupling component in this example, is obtained by reaction of N-(β-hydroxy-γ-phenoxy-propyl)-N-(β-cyanoethyl)-aniline with methylisocyanate at 50° with the addition of triethylamine.

If, in the previous Examples 1 to 4, the diazo component is replaced by the corresponding amount of one of the diazo components listed in column II of the following table and coupled, under the conditions described in the above examples, with corresponding amounts of one of the coupling components given in column III, then dyestuffs are obtained which produce, on polyethylene glycol terephthalate fibres, dyeings of similar good properties; the shades of the latter are given in the last column of the table.

TABLE I

| Ex. No. | Diazo component | X | Y | Z | R | Shade on polyethylene glycol terephthalate fibres |
|---|---|---|---|---|---|---|
| | | | | | Structure III: 2-Y, 5-X phenyl-N(CH$_2$CH$_2$CN)(CH$_2$-CH(O-Z)-CH$_2$OR) | |
| 5 | $O_2N$–C$_6$H$_3$(4-)–NH$_2$ | H | H | —COCH$_3$ | phenyl | Orange. |
| 6 | $O_2N$–C$_6$H$_3$(4-NO$_2$, 2-Cl)–NH$_2$ | H | H | —COCH$_3$ | phenyl | Do. |
| 7 | Same as above | Cl | H | —COCH$_3$ | phenyl | Do. |
| 8 | $O_2N$–C$_6$H$_2$(Cl,Cl)–NH$_2$ | —CH$_3$ | H | —COCH$_3$ | —CH$_2$-(tetrahydrofuran-2-yl) | Brown. |
| 9 | Same as above | Cl | H | —COCH$_3$ | —CH$_2$-phenyl | Do. |
| 10 | do | —CH$_3$ | H | —COCH$_3$ | cyclohexyl | Do. |
| 11 | do | H | H | —COCH$_3$ | phenyl | Do. |
| 12 | $O_2N$–C$_6$H$_2$(Cl, Br)–NH$_2$ | —CH$_3$ | H | —COCH$_3$ | phenyl | Do. |
| 13 | $O_2N$–C$_6$H$_2$(OCH$_3$, Cl)–NH$_2$ | —CH$_3$ | H | —COCH$_3$ | cyclohexyl | Do. |
| 14 | $O_2N$–C$_6$H$_3$–NH$_2$ (SO$_2$N(CH$_3$)$_2$) | H | H | —COCH$_3$ | 4-methylphenyl | Red. |
| 15 | $O_2N$–C$_6$H$_3$–NH$_2$ (SO$_2$OC$_4$H$_9$) | —CH$_3$ | H | —COCH$_3$ | phenyl | Red. |
| 16 | $O_2N$–C$_6$H$_3$–NH$_2$ (COOCH$_3$) | H | H | —COCH$_3$ | phenyl | Orange. |
| 17 | $O_2N$–C$_6$H$_2$(Cl,Cl)–NH$_2$ | —CH$_3$ | H | —COCH$_3$ | —CH$_3$ | Brown. |
| 18 | Same as above | H | H | —COCH$_3$ | —CH$_3$ | Do. |
| 19 | do | —CH$_3$ | H | —COCH$_3$ | phenyl | Do. |
| 20 | $O_2N$–C$_6$H$_4$–NH$_2$ | —CH$_3$ | H | —COCH$_3$ | phenyl | Orange. |
| 21 | $O_2N$–C$_6$H$_2$(Cl,Cl)–NH$_2$ | Cl | H | —COCH$_3$ | phenyl | Brown. |

TABLE I—Continued

| Ex. No. | Diazo component | X | Y | Z | R | Shade on polyethylene glycol terephthalate fibres |
|---|---|---|---|---|---|---|
| 22 | O₂N—⌬(Cl)(Cl)—NH₂ (2,5-dichloro-4-nitroaniline) | —CH₃ | H | —CONH—C₆H₅ | —C₆H₅ | Brown. |
| 23 | Same as above | —CH₃ | H | —CONH—CH₃ | —C₆H₅ | Do. |
| 24 | CN—⌬(CN)—NH₂ | H | H | —COCH₃ | —C₆H₅ | Orange. |
| 25 | O₂N—⌬(CN)—NH₂ | —CH₃ | H | —COOCH₃ | —C₆H₄—OCH₃ | Red. |
| 26 | O₂N—⌬(CN)—NH₂ | —NHCOCH₃ | H | —COCH₃ | —C₆H₅ | Ruby-red. |
| 27 | O₂N—⌬(SO₂CH₃)—NH₂ | H | H | —COCH₃ | —C₆H₅ | Red. |
| 28 | O₂N—⌬(NO₂)—NH₂ | H | H | —COCH₃ | —C₆H₅ | Red. |
| 29 | NCS—benzothiazole—NH₂ | H | H | —COCH₃ | —C₆H₅ | Scarlet. |
| 30 | H₃CO—benzothiazole—NH₂ | H | H | —COCH₃ | —C₆H₅ | Red-orange. |
| 31 | O₂N—⌬(Cl)(Cl)—NH₂ | H | —NHCOCH₃ | —COC₂H₅ | —C₂H₄—OC₂H₅ | Brown-red. |
| 32 | O₂N—⌬(NO₂)(Cl)—NH₂ | —NHCOH | H | —COCH₃ | —CH₃ | Do. |
| 33 | CH₃—SO₂—⌬(NO₂)—NH₂ | H | Cl | —CO—C₆H₅ | —C₂H₅ | Red. |
| 34 | CH₃SO₂—benzothiazole—NH₂ | H | H | —COCH₃ | —C₆H₅ | Red. |
| 35 | O₂N—⌬(SO₂C₆H₅)—NH₂ | H | H | —COCH₃ | —CH₃ | Red. |
| 36 | O₂N—⌬(CF₃)—NH₂ | H | H | —COCH₃ | —C₆H₅ | Red. |
| 37 | O₂N—⌬(CN)—NH₂ | H | H | —COCH₃ | —C₆H₅ | Red. |

EXAMPLE 38

17.32 g. of 1-amino-2-choro-4-nitrobenzene are diazotised in 100 ml. of concentrated sulphuric acid in the normal way. Then the diazonium solution is poured on to 300 g. of ice.

35.3 g. of N-(β-hydroxy-γ-phenoxypropyl)-N-(β-cyanoethyl)-3-acetylamino-aniline are dissolved in 500 ml. of 2-N-hydrochloric acid. To this solution is added, dropwise at 0–5°, the sulphuric acid diazonium solution, whereupon the dyestuff of the formula:

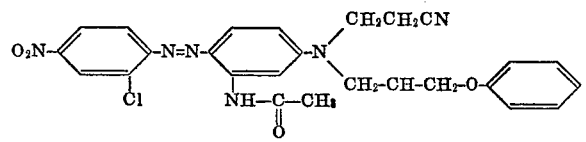

precipitates. It is filtered, washed with water to neutrality and dried at 65–70° in vacuo.

30 g. of the dry azo compound are slurried in 160 g. of glacial acetic acid and 30 g. of acetic acid anhydride. This suspension is heated to 100° and is maintained at this temperature for 5 hours. After cooling the suspension, the acetylated dyestuff of the formula

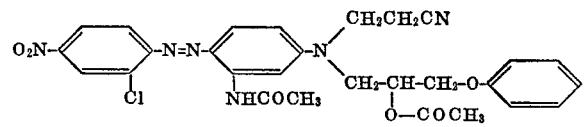

is precipitated by the slow dropwise addition of 500 ml. of water. From an aqueous dispersion, it dyes polyethylene glycol terephthalate fibers in scarlet-red shades. The obtained dyeings have a very good fastness to light and sublimation.

A dyestuff having similarly good properties is obtained by using in the above example, instead of 30 g. of acetoanhydride, the equivalent amount of propionic acid anhydride.

EXAMPLE 39

21.6 g. of 1-amino-2-methylsulphonyl-4-nitrobenzene were dissolved in 300 ml. acetic acid and mixed with 85 ml. of 36% hydrochloric acid and 35 ml. of water. The amine is then diazotised at 5° to 10° by the dropwise addition of a solution of 6.9 g. of sodium nitrite in 25 ml. of water. The clear diazonium solution is then added dropwise at 10° to 15° to a solution of 29.6 g. of N-(β-hydroxy-γ-phenoxypropyl)-N-(β-cyanoethyl)-aniline in 500 ml. of 50% acetic acid. After the completion of the coupling, the dyestuff so obtained is completely precipitated by the addition of 500 ml. of water, filtered off, washed and dried at 60° to 70° in vacuo.

10 g. of propionyl chloride are then added to 22 g. of this azo compound in 45 ml. of absolute pyridine. The mixture is heated to 100° and maintained at this temperature for 2 hours. It is then cooled and poured on to 500 g. of ice. The dyestuff of the formula

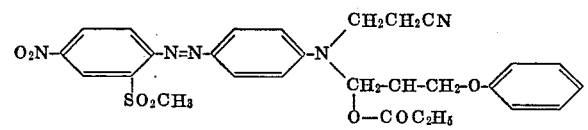

precipitates as a brown-red powder. It is filtered off, washed with water and dried in vacuo at 60–70°.

Finely ground with lignin sulphonate, it dyes polyethylene glycol terephthalate fibres, from an aqueous dispersion, in pure red shades. The obtained dyeings have a good fastness to washing, rubbing, light and sublimation.

EXAMPLE 40

18.3 g. of 1-amino-2,4-dinitrobenzene are diazotised in 80 ml. of concentrated sulphuric acid in the usual manner. The obtained diazonium solution is added dropwise at 5–10° to a solution of 23.4 g. of N-(β-hydroxy-γ-methoxy-propyl)-N-(β-cyanoethyl)-aniline in 500 ml. of 80% acetic acid. The obtained compound is filtered off, washed with water and dried at 60–70° in vacuo.

10 g. of propionyl chloride are then added to 21.4 g. of this azo compound in 45 ml. of absolute pyridine. The mixture is heated to 100° and maintained at this temperature for 2 hours. It is then cooled and poured on to 500 g. of ice. The dyestuff of the formula

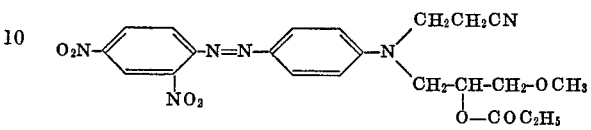

precipitates as a brown-red powder. It is filtered off, washed with water and dried in vacuo at 60–70°.

Finely ground with lignin sulphonate, it dyes polyethylene glycol terephthalate fibres, from an aqueous dispersion, in pure red shades. The obtained dyeings have a good fastness to washing, rubbing, light and sublimation.

Dyestuffs having similar properties are obtained by using in the above example, instead of propionyl chloride, equivalent amounts of butyryl chloride, benzoyl chloride, chloroformic acid methyl ester, benzenesulphonic acid chloride, p-toluene sulphonic acid chloride or mesyl chloride.

EXAMPLE 41

2 parts of the dyestuff obtained according to Example 11 are dispersed in 4000 parts of water. To this dispersion are added as a swelling agent, 12 parts of the sodium salt of o-phenylphenol as well as 12 parts of diammonium phosphate. 100 parts of yarn made from polyethylene glycol terephthalate are dyed therewith for 1½ hours at 95–98°. The dyeing is rinsed and aftertreated with aqueous sodium hydroxide solution and a dispersing agent.

By this means is obtained a brown dyeing having fastness to washing, light and sublimation.

If, in the above example, the 100 parts of polyethylene glycol terephthalate yarn are replaced by 100 parts of cellulose triacetate fabric, dyeing being performed under the stated conditions and the material being subsequently rinsed with water, then a brown dyeing is obtained having very good fastness to washing and sublimation.

EXAMPLE 42

In a pressure dyeing apparatus, 2 parts of the dyestuff, obtained according to Example 1, are finely suspended in 2000 parts of water containing 4 parts of oleylpolyglycol ether. The pH-value of the dye bath is adjusted to 6–6.5 with acetic acid.

100 parts of fabric made from polyethylene glycol terephthalate are then introduced at 50°, the bath is heated within 30 minutes to 140° and dyeing proceeds for 50 minutes at this temperature. The dyeing is subsequently rinsed with water, soaped and dried. Under these conditions is obtained a red dyeing having fastness to washing, perspiration, light and sublimation.

The dyestuffs described in the other examples produce, using this process, dyeings of equally high quality.

EXAMPLE 43

Polyethylene glycol terephthalate fabric is impregnated on a padding machine at 40° with a dye liquor of the following composition:

20 parts of the dyestuff, obtained according to Example
   10, finely dispersed in
   7.5 parts of sodium alginate,
   20 parts of triethanolamine,
   20 parts of octylphenolpolyglycol ether and
   900 parts of water.

The fabric, squeezed out to ca. 100%, is dried at 100° and subsequently fixed during 30 seconds at a temperature of 210°. The dyed material is rinsed with water, soaped and dried. Under these conditions is obtained a brown dyeing having fastness to washing, rubbing, light and sublimation.

The dyestuffs described in the other examples produce, using this process, dyeings of equally high quality.

I claim:

1. A dyestuff which is free from water-solubilizing groups dissociating acid in water and which corresponds to the formula

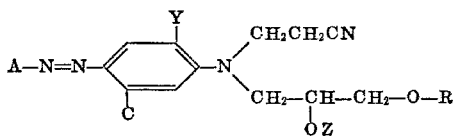

wherein

A is a phenyl radical substituted by at least one non-ionogenic, electron-attracting substituent selected from the group consisting of fluorine; chlorine; bromine; cyano; nitro; trifluoromethyl; lower alkylsulfonyl; phenylsulfonyl; phenoxysulfonyloxy; alkyloxysulfonyl; phenoxycarbonyl; methoxycarbonyl; ethoxycarbonyl; isopropoxycarbonyl; butoxycarbonyl; unsubstituted aminocarbonyl and aminosulfonyl; and aminocarbonyl and aminosulfonyl substituted by a phenyl, lower alkyl, lower hydroxyalkyl, lower alkanoyloxyalkyl, lower alkoxyalkyl, lower cyanoalkyl, cyclohexyl or phenyl-lower-alkyl;

X and Y each are, independently of each other, hydrogen, lower alkyl, lower alkanoylamino, bromine or chlorine;

Z is unsubstituted alkanoyl containing up to 4 carbon atoms; alkanoyl containing up to 4 carbon atoms substituted by chlorine, bromine, or lower alkoxy; benzoyl; lower alkoxycarbonyl; phenoxycarbonyl; lower alkylaminocarbonyl; phenylaminocarbonyl; lower alkylsulfonyl; phenylsulfonyl or p-methylsulfonyl; and R is unsubstituted lower alkyl; lower alkyl substituted by lower alkoxy, cyano, chlorine, bromine, phenyl, chlorophenyl, methylphenyl; cyclohexyl; phenyl; and phenyl substituted by fluorine, chlorine, bromine, lower alkyl, or lower alkoxy.

2. A dyestuff as defined in claim 1 wherein A represents a phenyl radical bearing the following substituents:

(a) as first substituent nitro or cyano,
(b) a second substituent selected from hydrogen, nitro, cyano, chlorine, bromine, trifluoromethyl, lower alkylsulfonyl, phenylsulfonyl, lower alkoxy, lower alkoxysulfonyl, lower alkoxy-carbonyl and di-(lower alkyl) amino-sulfonyl and
(c) a third substituent selected from hydrogen, chlorine and bromine.

3. A dyestuff as defined in claim 2 wherein

Z represents lower alkanoyl, benzoyl, lower alkylsulfonyl, phenylsulfonyl, methylphenylsulfonyl, lower alkoxycarbonyl, lower alkylaminocarbonyl, or phenylaminocarbonyl, and R represents lower alkyl, lower alkoxy-lower alkyl, benzyl, or a phenyl radical any substituent of which is selected from lower alkyl, lower alkoxy, chlorine, and bromine.

4. A dyestuff as defined in claim 2 wherein said first substituent of the phenyl radical is in o- or p-position relative to the adjacent azo bridge.

5. A dyestuff as defined in claim 3 wherein Z represents acetyl.

6. A dyestuff as defined in claim 3 wherein R represents phenyl.

7. A dyestuff as defined in claim 3 which is of the formula

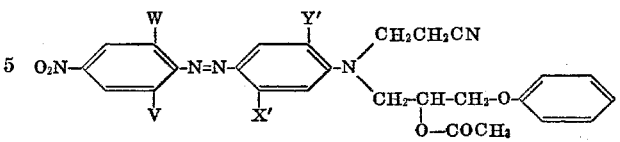

wherein

V represents hydrogen, cyano, chlorine or lower alkylsulfonyl,

W represents hydrogen or chlorine,

X' represents hydrogen, lower alkyl, lower alkanoylamino or chlorine, and

Y' represents hydrogen or chlorine.

8. A dyestuff as defined in claim 7 which is of the formula

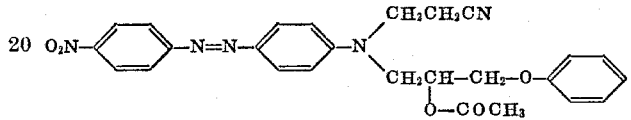

9. A dyestuff as defined in claim 7 which is of the formula

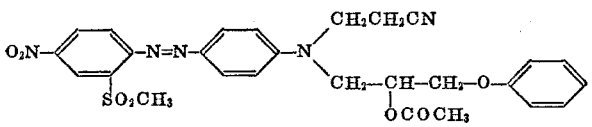

10. A dyestuff as defined in claim 7 which is of the formula

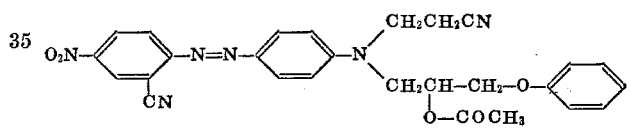

11. A dyestuff as defined in claim 7 which is of the formula

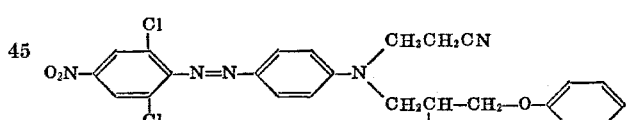

12. A dyestuff as defined in claim 7 which is of the formula

References Cited

UNITED STATES PATENTS

| | | | |
|---|---|---|---|
| 3,621,009 | 11/1971 | Ono et al. | 260—207 |
| 2,323,314 | 7/1943 | Dickey et al. | 260—207.1 X |
| 3,337,522 | 8/1967 | Wegmüller | 260—207 X |

LEWIS GOTTS, Primary Examiner

C. F. WARREN, Assistant Examiner

U.S. Cl. X.R.

8—41 B, 41 C, 41 D, 50; 260—152, 158, 205, 206, 207